United States Patent [19]

Gregor et al.

[11] 4,341,632

[45] Jul. 27, 1982

[54] DESTRUCTION OF BULKING SLUDGE

[75] Inventors: Carl-Heinz Gregor, Germering; Hans Reimann, Munich; Alfred Wildmoser, Haar, all of Fed. Rep. of Germany

[73] Assignee: Linde Aktiengesellschaft, Wiesbaden, Fed. Rep. of Germany

[21] Appl. No.: 162,862

[22] Filed: Jun. 25, 1980

Related U.S. Application Data

[63] Continuation of Ser. No. 972,627, Dec. 22, 1978, abandoned.

[30] Foreign Application Priority Data

Dec. 23, 1977 [DE] Fed. Rep. of Germany ....... 2757742

[51] Int. Cl.³ .............................................. C02F 3/12
[52] U.S. Cl. .................................. 210/608; 210/625; 210/626; 210/631
[58] Field of Search ............... 210/607, 608, 609, 620, 210/621, 623, 624, 625, 626, 787, 631

[56] References Cited

U.S. PATENT DOCUMENTS

| | | | |
|---|---|---|---|
| 3,673,083 | 6/1972 | Sawyer et al. | 210/18 |
| 3,959,124 | 5/1976 | Tchobanoglous | 210/6 |
| 4,056,465 | 11/1977 | Spector | 210/7 |
| 4,086,160 | 4/1978 | Roesler | 210/13 |

FOREIGN PATENT DOCUMENTS 2125141 11/1972 Fed. Rep. of Germany ........ 210/13

OTHER PUBLICATIONS

Rensink, "New Approach to Preventing Bulking Sludge", *WPCFJ*, Aug. 1974, pp. 1888–1894.

*Primary Examiner*—Peter A. Hruskoci
*Attorney, Agent, or Firm*—Millen & White

[57] ABSTRACT

In an activated sludge process for the biological purification of wastewater wherein undesirable bulking sludge is formed in addition to normal activated sludge, the improvement which comprises mechanically destroying the microorganisms causing the bulking sludge without substantially destroying the microorganisms required for the normal activated sludge.

6 Claims, 1 Drawing Figure

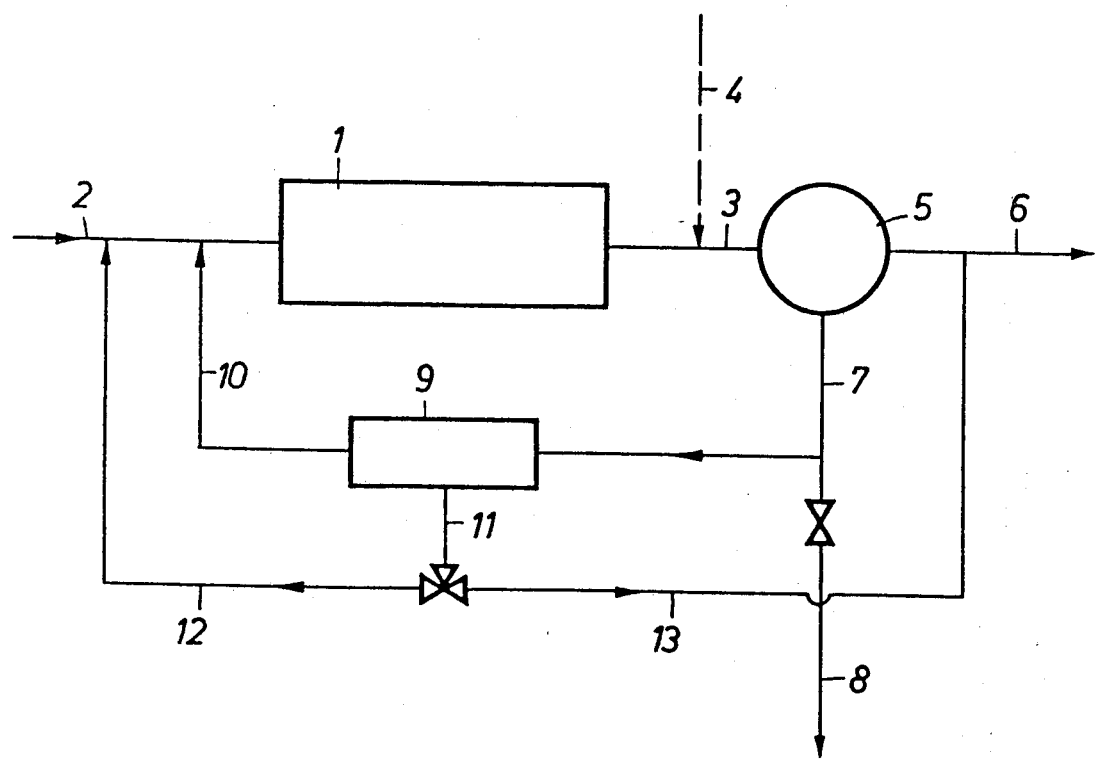

DESTRUCTION OF BULKING SLUDGE

This is a continuation of application Ser. No. 972,627 filed Dec. 22, 1978, now abandoned.

BACKGROUND OF THE INVENTION

This invention relates to a process for the biological purification of wastewater, and in particular to the problem of undesirable "bulking sludge" formation caused by the proliferation of certain microorganisms.

For a reference relating to the general field, reference is made to the monograph "Aerobic Biological Treatment of Waste Waters, Principles and Practice", Arthur W. Busch, 1971, Oligodynamics Press, Houston, Tex.

As known, bulking sludge, a "fluffy" activated sludge of a low solids weight content which impedes settling operations, is produced by the excessive growth of certain microorganisms which do not form morphologically normal activated sludge. Such bacteria are primarily filamentous bacteria and algae, as well as bacteria having thick slime jackets, and others. According to prior knowledge, the growth of such microorganisms is largely dependent on certain materials present in the wastewater, such as carbohydrates, organic acids, or heavy metals, among others. Also the lack of certain trace nutrients can have this effect. Upon the occurrence of such anomalous activated sludges, the low settling velocity of same leads to difficulties in the secondary treatment stage insofar as the biologically purified wastewater cannot be easily separated from the activated sludge. There is thus the danger that the activated sludge, by not settling at a sufficient rate, will float into the drainage ditch. This would not only place a burden on the drainage ditch, but could also result in a loss of the biologically active substance required for the biological purification.

In the case of certain wastewaters, especially those stemming from the foodstuff industry, it is not always possible to balance the supplied nutrients and the load on the activated sludge plant so as to prevent the development of the microorganisms causing the bulking sludge.

In such cases, countermeasures against the formation of bulking sludge have taken the form of either the installation of especially large secondary treatment tanks to take into account the low settling velocity of the bulking sludge, or the addition of precipitants and/or flocculants which weight down the bulking sludge and cause the same to flocculate. As for the troublesome filamentous bacteria which frequently occur in the bulking sludge, an attempt has been made to destroy these bacteria selectively by the addition of specific chemicals, such as chlorine or hydrogen peroxide.

A substantial disadvantage of merely utilizing larger secondary treatment tanks resides in the fact that microorganisms constituting the bulking sludge, which have settled or flocculated after a long residence time in the secondary treatment stage, remain present in the recycle sludge. Thus in the sedimentation stage, the recycle sludge together with identical newly formed microorganisms from the aeration stage again prevent the settling of the activated sludge in the secondary treatment stage thereby failing to eradicate the cause of the problem. Conversely, the technique employed to selectively poison the microorganisms chemically is difficult to control, and if at all effective, treats only the more sensitive types of filamentous organisms.

SUMMARY OF THE INVENTION

An object of this invention is to provide an improved system for the solution of the bulking sludge problem in the biological purification of wastewater. A particular object is to provide a system which works independently of the supplied nutrients and of the load condition on the activated sludge plant.

Upon further study of the specification and appended claims, further objects and advantages of this invention will become apparent to those skilled in the art.

To achieve these objects a system is provided in accordance with this invention wherein the microorganisms causing the bulking sludge are mechanically destroyed. By virtue of the mechanical destruction of the microorganisms causing the bulking sludge, the activated sludge no longer floats on the top in the sedimentation stage, so that flawless separation of the activated sludge from the purified wastewater becomes possible in the secondary treatment.

To attain the mechanical destruction of the microorganisms producing the bulking sludge, it is advantageous to expose the bulking sludge to high acceleration forces. This can be done in a simply way, according to an advantageous further development of the idea of this invention, by centrifuging the bulking sludge. With the production of artificial gravitational fields, for example, in separators or decanter centrifuges, the microorganisms forming the bulking sludge are then subjected to high shear stresses, effecting a tearing apart and crushing of the microorganisms. In case of filamentous bacteria, for example, this action not only breaks up the balls of thread, but also tears the individual threads into little pieces.

As has been demonstrated, good results can be obtained with centrifuges for improving the settling rate of the activated sludge in the sedimentation stage, if these centrifuges are operated at speeds of up to 8000 revolutions per minute, wherein the bulking sludge is exposed to an acceleration corresponding to a gravitational constant of up to 8000 g's. The thus-occurring shear stresses then are high enough to ensure a complete dissolution of the bulking sludge.

In essence, the invention is based on the discovery that it is possible to subject the activated sludge to sufficient mechanical stress to remove the deleterious effect of the microorganisms causing bulking sludge without simultaneously substantially destroying (e.g. not more than 50%) the desired microorganisms used for forming normal activated sludge. In this connection, bulking sludge means a sludge with a sludge volume index (SVI) of above 200-300 ml/g. Examples for sludge bulking organisms are spaerotilus natans, beggiatoa alba, nocardia, whereas normal floc forming organisms are, zoogloen ramigera, aerobacter aerogenes. Filamentous organisms are preferably cut to shorter pieces and/or densified to agglomerates and as such are inhibited from fast growing.

In accordance with a further embodiment of the idea of this invention, it is advantageous to destroy the microorganisms causing the bulking sludge, contained in the recycle sludge and in the floating sludge, prior to passing the recycle sludge and the floating sludge into the aeration basin of an activated sludge plant. In this process, the thickened sludge obtained for example during centrifuging is fed back to the aeration basin and the clear water obtained thereby, is fed to the drainage ditch and/or to the aeration basin. In this way, it is possible to affect all of the microorganisms contained in the activated sludge cycle causing the production of bulking sludge.

To be able to increase the settling velocity of any bulking sludge present, it is furthermore advantageous to add precipitants and/or flocculants to the aeration stage, for example, or also after the aeration stage; these agents improve the settling properties of the sludge. Thereby, the detection of the microorganisms which form the bulking sludge and the introduction of these microorganisms, for example, into a centrifuge, are facilitated. Examples of these conventional precipitants or flocculants which are to be added in a conventional manner include but are not limited to: lime, ferrous sulphate, ferric chloride.

BRIEF DESCRIPTION OF DRAWING

The attached FIGURE is a schematic flowsheet of an activated sludge plant suitable for conducting the process of this invention.

DETAILED DESCRIPTION OF DRAWING

The FIGURE depicts an aeration tank 1 of one or more stages or multiple stages, comprising an inlet 2 for watewater to be purified and an outlet 3. Depending on the type of activated sludge plant, the wastewater—activated sludge mixture can be conventionally treated in the aeration tank with air, pure oxygen, or with oxygen-enriched air. The outlet 3, to which can be connected a feed conduit 4 for precipitant and/or flocculant, is in communication with a sedimentation tank 5 which, in turn, is provided with a drain 6 leading to a drainage ditch for purified wastewater and a discharge conduit 7 for thickened sludge. The discharge conduit 7, which has a valved branch line 8 for the draining of excess sludge from the aeration stage, leads to a centrifuge 9, for example a separator or decanter centrifuge. The sedimentation tank 5 can furthermore be connected to the centrifuge 9 via another discharge conduit, not shown, by way of which the floating sludge obtained in the sedimentation tank 5 and collected by a floating sludge remover can be fed to the centrifuge 9. The centrifuge 9 is connected via a connecting conduit 10 to the inlet 2 of the aeration tank 1 to transfer thickened sludge, whereas the clear water drain 11 of the centrifuge 9 is connected, via a conduit 12, likewise to the inlet 2 of the aeration tank 1 and, via a further conduit 13, to the drain 6 of the sedimentation tank 5 leading to the drainage ditch.

The microorganisms forming the bulking sludge, growing in the aeration tank 1 due to an unbalanced supply of nutrients, enter the sedimentation tank 5 together with the wastewater—activated sludge mixture leaving the aeration tank 1 via the outlet 3. In the sedimentation tank 5, the bulking sludge then floats, in part, to the top and, in part, drops to the bottom gradually or quickly, depending on the introduction of precipitants of flocculants via the conduit 4. However, since the recycle sludge is fed to the centrifuge 9 via the discharge conduit 7 of the sedimentation tank 5, along with the floating sludge with the aid of the floating sludge remover and the drain associated therewith, assurance is obtained that all microorganisms present in the sedimentation tank 5 and producing the bulking sludge pass into the centrifuge 9, where they are destroyed due to the acceleration forces occuring therein. The sludge thickened in the centrifuge 9 can then be returned without danger into the aeration tank 1. A portion of the clear water discharge from the centrifuge 9 is utilized for diluting the wastewater—activated sludge mixture in the aeration tank 1, while he remainder is fed to the drain 6 of the sedimentation tank 5 leading to the drainage ditch.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following Examples relate to two biological wastewater treatment plants on a laboratory scale with an aeration tank and a secondary treatment tank with sludge recycling to the aeration tank. The second installation was provided with a separator behind the secondary treatment tank in which the recycled sludge was thickened and from which the thickened sludge was recycled to the aeration tank. The first installation had no separator.

The input to both installations of 110 ml/h each consisted of waste-water of a flaying house and tap water in the portion 1:1. The input had a pH-value of 7.85 and a temperature of 20° C.

The following table shows measurements which were obtained with both installations at a time interval of four days.

|  |  | Inlet | | Outlet | | COD Decomposition % | $BOD_5$ Decomposition % | Settling Volume ml/l | Mohlman-Index ml/g |
|---|---|---|---|---|---|---|---|---|---|
|  |  | COD $mg\ O_2$ l | $BOD_5$ $mg\ O_2$ l | COD $mg\ O_2$ l | $BOD_5$ $mg\ O_2$ l |  |  |  |  |
| 1.Test | Installation 1 | 1844 | 2562 | 268.6 | 19 | 85.4 | 99.3 | 988 | 302.1 |
|  | Installation 2 | 1844 | 2562 | 1101 | 229 | 40.3 | 91.1 | 987 | 178.2 |
| 2.Test | Installation 1 | 2177 | 1852 | 183 | 26 | 91.6 | 98.6 | 980 | 240 |
|  | Installation 2 | 2177 | 1852 | 187 | 37 | 91.4 | 98 | 989 | 169.4 |

A comparison of the COD decomposition efficiencies shows that the quality of the recycled sludge was at first slightly diminished by the treatment in the separator (decomposition efficiency in installation 2 only about 40%, decomposition efficiency in installation 1 about 85.4%). After about four days, however, in both installations comparable decomposition efficiencies were measured, i.e. the separator caused only a short time damage of the activated sludge.

By a microscopic observation of the sludge floccules, it could be ascertained that in installation 1 there was practically only filamental sludge and no flocculated sludge, while in installation 2 the short filaments existing in the sludge did not grow any further. The biozone in installation 2 was richer in species than in installation 1 and yielded good sludge floccules.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an activated sludge process for the biological purification of wastewater, said activated sludge process comprising an aeration stage wherein undesirable bulking sludge is formed in addition to normal activated sludge, followed by a sedimentation stage wherein a thickened sludge is separated from purified wastewater, the improvement wherein all the undesirable bulking sludge formed in the aeration stage is passed to the sedimentation stage and is contained in said thickened sludge, withdrawing said thickened sludge from the sedimentation stage and subjecting at least a fraction of said thickened sludge to sufficiently high centrifugal forces so as to destroy substantially all the microorganisms causing the bulking sludge without substantially destroying the microorganisms required for the normal activated sludge, and recycling to said aeration stage an activated sludge consisting essentially of the normal activated sludge obtained from the centrifugation step.

2. A process according to claim 1, wherein the centrifugal force acting on the thickened sludge is on the order of 8000 g's.

3. A process according to claim 1, wherein the withdrawn thickened sludge passed to the centrifugation step comprises a mixture of floating sludge and bottom sludge.

4. A process according to claim 3, wherein all the floating sludge from the sedimentation stage is subjected to centrifugation.

5. A process according to claim 4, wherein only a fraction of the bottom sludge from the sedimentation stage is subjected to centrifugation.

6. In an activated sludge process for the biological purification of wastewater, said activated sludge process comprising an aeration stage wherein undesirable bulking sludge is formed in addition to normal activated sludge, followed by a sedimentation stage wherein a thickened sludge is separated from purified wastewater, the improvement wherein all the undesirable bulking sludge formed in the aeration stage is passed to the sedimentation stage and is contained in said thickened sludge, the latter being a mixture of floating sludge and bottom sludge, withdrawing said thickened sludge from the sedimentation stage and subjecting at least a fraction of said thickened sludge to sufficiently high centrifugal forces on the order of 8000 g's so as to destroy substantially all the microorganisms causing the bulking sludge without substantially destroying the microorganisms required for the normal activated sludge, and recycling to said aeration stage an activated sludge consisting essentially of the normal activated sludge obtained from the centrifugation step.

* * * * *